US012634291B2

(12) United States Patent
Clark et al.

(10) Patent No.: US 12,634,291 B2
(45) Date of Patent: May 19, 2026

(54) SCHEMA BASED ACCESS MANAGEMENT FOR IMPROVED INFORMATION SECURITY

(71) Applicant: Bank of America Corporation, Charlotte, NC (US)

(72) Inventors: Nathaniel Clark, Wheaton, IL (US); Luke Sharief, Libertyville, IL (US); Dhivya Hariharan, Dallas, TX (US); Jeffrey Sackett, Stanley, NC (US); Trina Perraut, Alexis, NC (US); Cara Bresnahan, Chicago, IL (US); Christopher Rice, Charlotte, NC (US); David Strommer, Saint Johns, FL (US); Dave Middleton, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 356 days.

(21) Appl. No.: 18/220,455

(22) Filed: Jul. 11, 2023

(65) Prior Publication Data
US 2025/0023877 A1    Jan. 16, 2025

(51) Int. Cl.
*H04L 9/40*          (2022.01)
(52) U.S. Cl.
CPC .......... *H04L 63/105* (2013.01); *H04L 63/104* (2013.01)
(58) Field of Classification Search
CPC .......................... H04L 63/104; H04L 63/105
See application file for complete search history.

(56) References Cited

U.S. PATENT DOCUMENTS

| | | | |
|---|---|---|---|
| 11,336,650 B1 | 5/2022 | Dargude et al. | |
| 11,487,792 B1 | 11/2022 | Mendell | |
| 11,533,619 B1 | 12/2022 | Kahn | |
| 2009/0282114 A1* | 11/2009 | Feng | ..... G06Q 10/107 |
| | | | 709/206 |
| 2010/0153327 A1* | 6/2010 | Cowham | ..... G06F 21/6218 |
| | | | 706/47 |
| 2018/0259923 A1 | 9/2018 | De et al. | |
| 2018/0293397 A1* | 10/2018 | DeMember | ..... H04L 63/10 |
| 2020/0412726 A1* | 12/2020 | Nevatia | ..... H04L 63/102 |
| 2021/0174219 A1 | 6/2021 | Gupta | |
| 2021/0240471 A1 | 8/2021 | Braz et al. | |
| 2021/0406391 A1* | 12/2021 | Philip | ..... H04L 63/105 |
| 2022/0138023 A1 | 5/2022 | Shuster et al. | |
| 2022/0141224 A1 | 5/2022 | Pulsifer et al. | |
| 2022/0382854 A1 | 12/2022 | Ungerholm | |
| 2022/0382888 A1 | 12/2022 | Ghiold et al. | |
| 2022/0385607 A1 | 12/2022 | Hassan | |

(Continued)

*Primary Examiner* — Theodore C Parsons
(74) *Attorney, Agent, or Firm* — Banner & Witcoff, Ltd.

(57) ABSTRACT

A computing platform may generate a schema to prompt for user access information, wherein the user access information includes: 1) a set of authorized users and 2) one or more portions of an information source to which the set of authorized users have access. The computing platform may send, to a first user device, the schema. The computing platform may receive, from the first user device, the user access information. The computing platform may translate the user access information to structured user information, which may include translating the user access information from a first format into a second format. The computing platform may send, to a second user device corresponding to one of the set of authorized users, the structured user information.

18 Claims, 8 Drawing Sheets

(56)     References Cited

U.S. PATENT DOCUMENTS

| | | | |
|---|---|---|---|
| 2022/0385667 A1 | 12/2022 | Ghiold et al. | |
| 2022/0385668 A1 | 12/2022 | Simonetti et al. | |
| 2022/0394466 A1* | 12/2022 | Cho | G06F 21/6218 |
| 2022/0400112 A1 | 12/2022 | Cavalcanti et al. | |
| 2023/0023645 A1 | 1/2023 | Retinraj et al. | |
| 2023/0024602 A1 | 1/2023 | Powell et al. | |
| 2023/0025544 A1 | 1/2023 | Rohatgi et al. | |
| 2023/0034914 A1 | 2/2023 | Dong | |
| 2023/0057286 A1 | 2/2023 | Osipov et al. | |
| 2023/0068342 A1 | 3/2023 | Matei et al. | |

* cited by examiner

102

111

112

113

Access Management Platform

Processor(s)

Memory(s)

Access Management Module
112a

Access Management Database
112b

Machine Learning Engine
112c

Communication Interface(s)

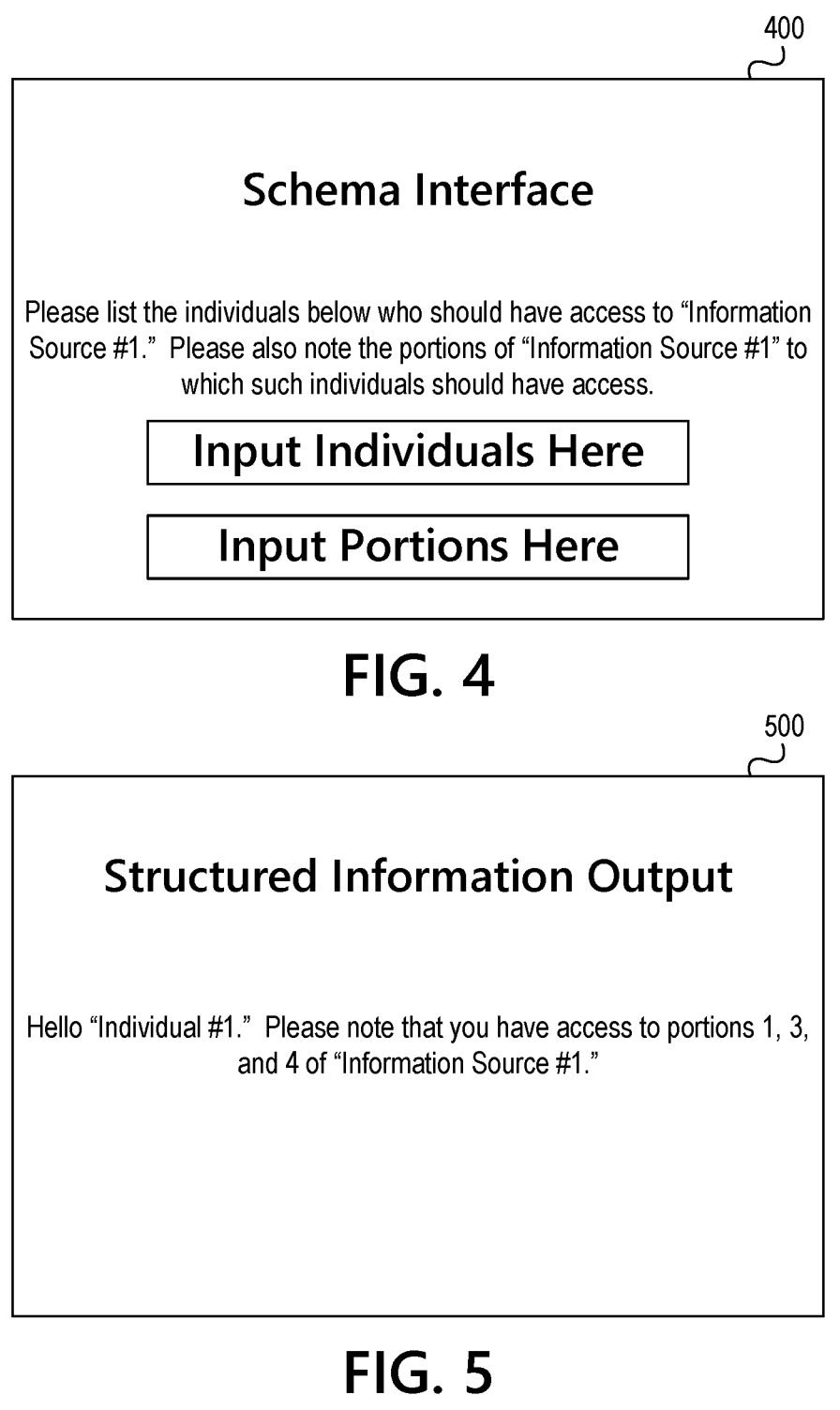

400

Schema Interface

Please list the individuals below who should have access to "Information Source #1." Please also note the portions of "Information Source #1" to which such individuals should have access.

Input Individuals Here

Input Portions Here

Structured Information Output

Hello "Individual #1." Please note that you have access to portions 1, 3, and 4 of "Information Source #1."

FIG. 5

SCHEMA BASED ACCESS MANAGEMENT FOR IMPROVED INFORMATION SECURITY

BACKGROUND

In some instances, user access permissions may be defined for a number of users. As the number of users increases, however, the likelihood of error and/or misuse (e.g., in defining the user access permissions) may be increased. This may result in unauthorized information access, exposure of sensitive information, and/or otherwise be problematic. It may be important to provide a solution for defining user access permissions that reduces such likelihood of error and provides improved information security.

SUMMARY

Aspects of the disclosure provide effective, efficient, scalable, and convenient technical solutions that address and overcome the technical problems associated with user access permissions. In accordance with one or more embodiments of the disclosure, a computing platform comprising at least one processor, a communication interface, and memory storing computer-readable instructions may generate a schema to prompt for user access information, which may include: 1) a set of authorized users, and 2) one or more portions of an information source to which the set of authorized users have access. The computing platform may send, to a first user device, the schema and one or more commands directing the first user device to display the schema, which may cause the first user device to display the schema, and the user access information may be received, at the first user device, via a graphical user interface of the first user device. The computing platform may receive, from the first user device, the user access information. The computing platform may translate the user access information to structured user information, which may translate the user access information from a first format, in which the user access information was input at the first user device, into a second format configured for display to each user of the set of authorized users, and the first format may be different than the second format. The computing platform may send, to a second user device corresponding to one user of the set of authorized users, the structured user information and one or more commands directing the second user device to display the structured user information, which may cause the second user device to display the structured user information.

In one or more instances, the computing platform may train, using historical user information, a rules engine, which may configure the rules engine to distinguish between valid and invalid user access information. The computing platform may identify, using the rules engine, whether or not the user access information is valid, where translating the user access information may be in response to identifying that the user access information is valid.

In one or more examples, translating the user access information may include: 1) normalizing the user access information, which may include identifying one or more flags corresponding to the user access information; and 2) identifying a natural language response corresponding to a pattern of the one or more flags, where the structured user information may be the natural language response. In one or more examples, the structured user information may correspond to a plain language sentence format.

In one or more instances, translating the user access information to structured user information may include inputting, into a preconfigured sentence structured in the plain language sentence format, the user access information, where the preconfigured sentence may include placeholders that may be replaced by the user access information. In one or more instances, the computing platform may send, to additional user devices of the set of authorized users, the structured user information, where the structured user information may be consistent between: the one of the set of authorized users and the set of the authorized users.

In one or more examples, receiving the user access information may include receiving additional user access information that includes one or more fields different than those corresponding to the user access information. In one or more examples, the computing platform may update, based on the one or more fields, the schema.

In one or more instances, the computing platform may train, based on the user access information, a machine learning model, which may configure the machine learning model to auto-populate the schema based on the user access information. In one or more instances, training the machine learning model may further configure the machine learning model to identify anomalies in the user access information.

BRIEF DESCRIPTION OF DRAWINGS

The present disclosure is illustrated by way of example and is not limited in the accompanying figures in which like reference numerals indicate similar elements and in which:

FIGS. 4-5 depict illustrative user interfaces for preventing unauthorized information access in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to providing generic and scalable metadata registration capability to describe the entitlements during an entitlement registration process directly from source to destination (e.g., system to system) to ensure born compliance of platform and application provided metadata from landlord platforms on behalf of client applications.

Described herein are schema formats to transform and process various types of accounts or platforms describing metadata at the source. This may be achieved by identifying the schema identifiers and recognizing the source format to transform the incoming data into structured metadata describing entitlements by leveraging transformation events and applying message processing logic.

More specifically, customer schema identifiers may be used to transform various types of structured data, with each schema identifier having its own unique format. There is also a possibility of additional identity or account schemas. The metadata ingestion process makes it easy to customize and extend. Each schema may be designed with its own standard format, and each provider or client may choose their preferred schema by specifying the identifier, which may then be used to guide processing. The design may enable the solution to be scalable and extensible.

In some instances, machine learning algorithms may be used to extract the data for millions of permissions and attributes to be canned and ingested. These and other features are described in greater details below.

Figure 1A:
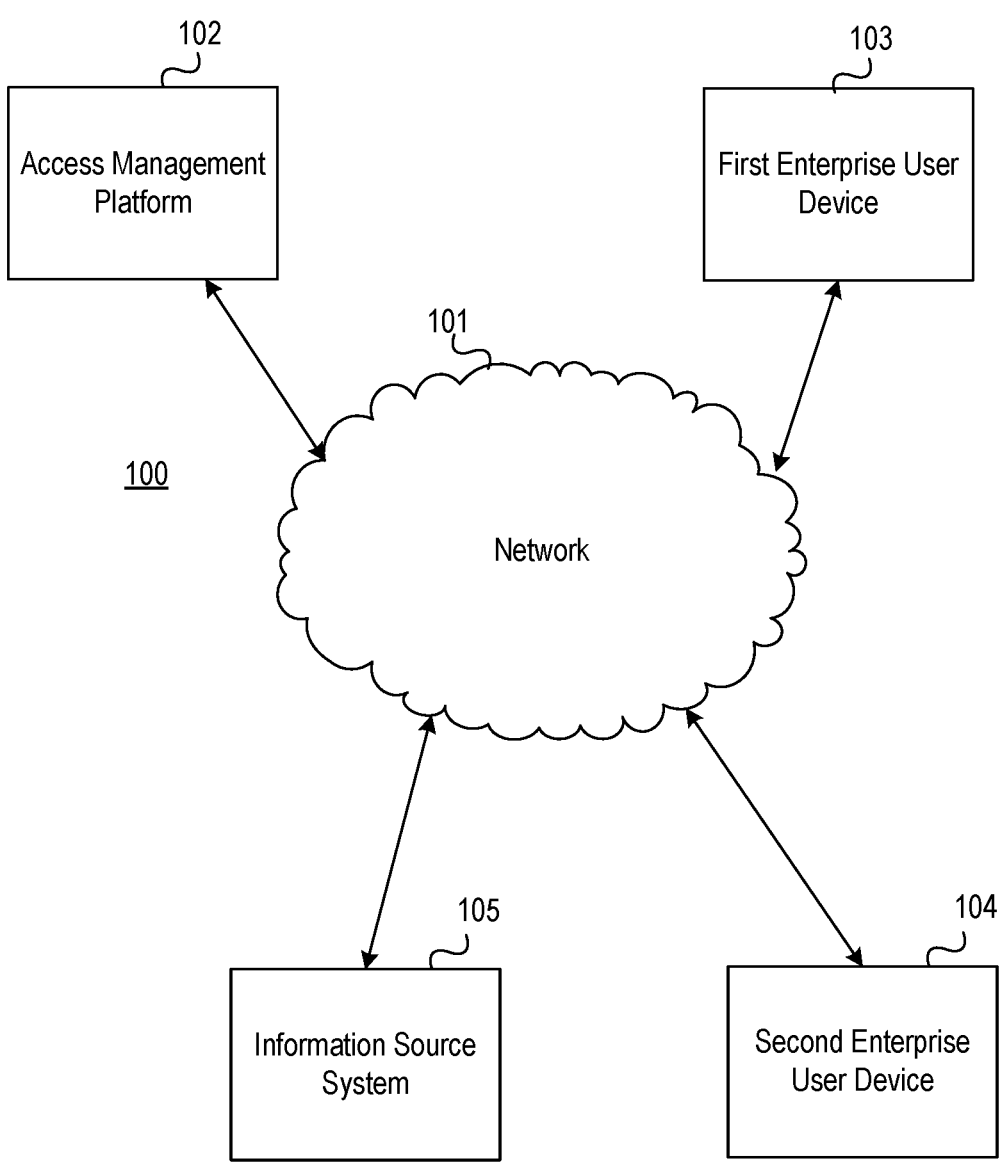
FIGS. 1A and 1B depict an illustrative computing environment for preventing unauthorized information access in accordance with one or more example embodiments.
Figure 1B:
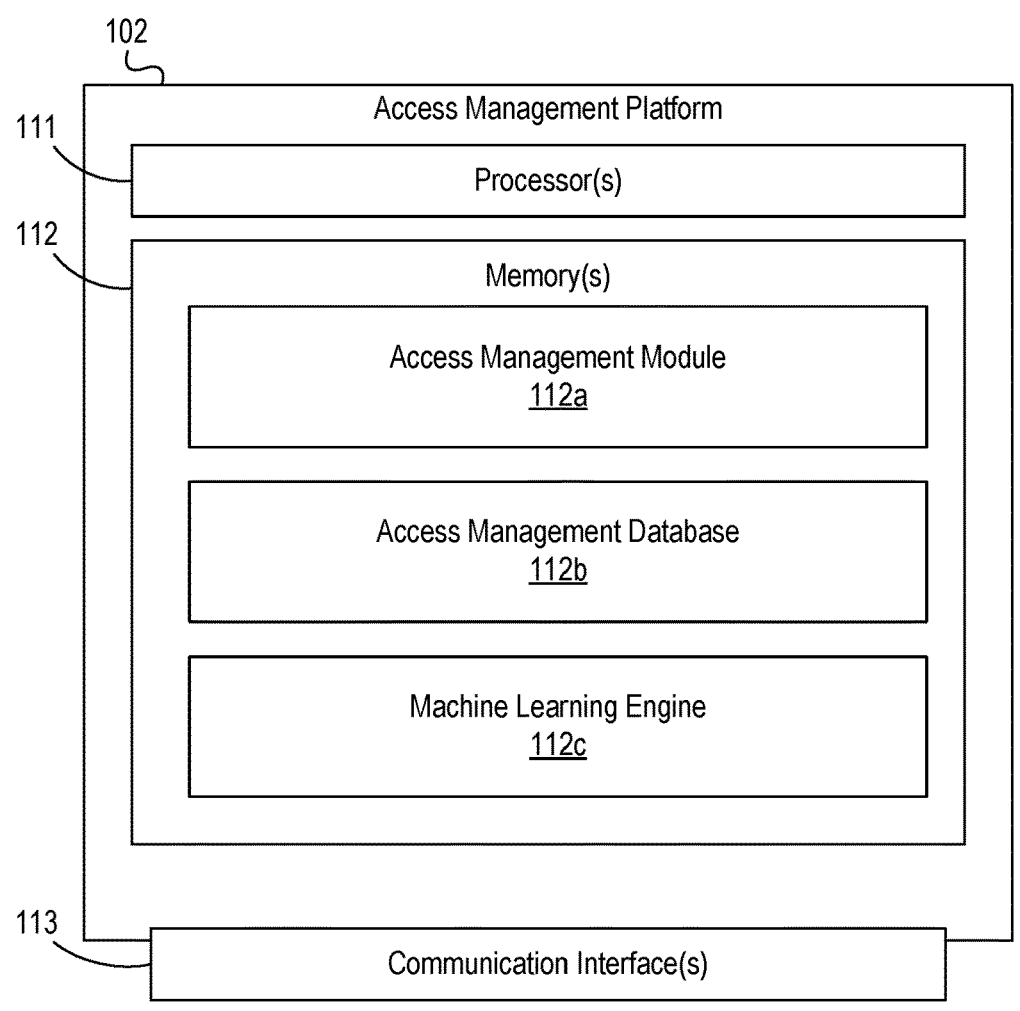

FIGS. 1A-1B depict an illustrative computing environment for preventing unauthorized information access in accordance with one or more example embodiments. Referring to FIG. 1A, computing environment 100 may include one or more computer systems. For example, computing environment 100 may include access management platform 102, first enterprise user device 103, second enterprise user device 104, and information source system 105.

Access management platform 102 may include one or more computing devices and/or other computer components (e.g., processors, memories, communication interfaces, or the like). For example, the access management platform 102 may be configured to generate schemas, reconfigure and/or translate user access information, and/or otherwise control user access to one or more information source systems, as is described further below.

First enterprise user device 103 may be or include one or more devices (e.g., laptop computers, desktop computer, smartphones, tablets, and/or other devices) configured for use in defining user access information such as who has access to what information. In some instances, the first enterprise user device 103 may be operated by a team lead, manager, and/or other individual tasked with defining user access permissions for one or more other individuals (who may, e.g., be team members, employees, or the like). In some instances, the first enterprise user device 103 may be configured to display graphical user interfaces (e.g., schema interfaces, or the like). Any number of such user devices may be used to implement the techniques described herein without departing from the scope of the disclosure.

Second enterprise user device 104 may be or include one or more devices (e.g., laptop computers, desktop computer, smartphones, tablets, and/or other devices) configured for use in accessing information. For example, the second enterprise user device 104 may be used by an individual who may, e.g., be an employee, team member, or the like associated with a manager or other employee corresponding to the first enterprise user device 103. In some instances, the second enterprise user device 104 may be configured to display graphical user interfaces (e.g., structured information outputs, or the like). Any number of such user devices may be used to implement the techniques described herein without departing from the scope of the disclosure.

Information source system 105 may be or include one or more devices (e.g., servers, server blades, or the like). For example, the information source system 105 may be configured to store information (e.g., account information, enterprise information, and/or other information), which may, in some instances, include sensitive information and/or other information for which access permissions may be defined. In these instances, the information source system 105 may be configured to provide such information upon request based on the access permissions. Any number of such information source systems may be used to implement the techniques described herein without departing from the scope of the disclosure.

Computing environment 100 also may include one or more networks, which may interconnect access management platform 102, first enterprise user device 103, second enterprise user device 104, and information source system 105. For example, computing environment 100 may include a network 101 (which may interconnect, e.g., access management platform 102, first enterprise user device 103, second enterprise user device 104, and information source system 105).

In one or more arrangements, access management platform 102, first enterprise user device 103, second enterprise user device 104, and information source system 105 may be any type of computing device capable of receiving a user interface, receiving input via the user interface, and communicating the received input to one or more other computing devices. For example, access management platform 102, first enterprise user device 103, second enterprise user device 104, information source system 105, and/or the other systems included in computing environment 100 may, in some instances, be and/or include server computers, desktop computers, laptop computers, tablet computers, smart phones, or the like that may include one or more processors, memories, communication interfaces, storage devices, and/or or other components. As noted above, and as illustrated in greater detail below, any and/or all of access management platform 102, first enterprise user device 103, second enterprise user device 104, and information source system 105 may, in some instances, be special-purpose computing devices configured to perform specific functions.

Referring to FIG. 1B, access management platform 102 may include one or more processors 111, memory 112, and communication interface 113. A data bus may interconnect processor 111, memory 112, and communication interface 113. Communication interface 113 may be a network interface configured to support communication between access management platform 102 and one or more networks (e.g., network 101, or the like). Memory 112 may include one or more program modules having instructions that when executed by processor 111 cause access management platform 102 to perform one or more functions described herein and/or one or more databases that may store and/or otherwise maintain information which may be used by such program modules and/or processor 111. In some instances, the one or more program modules and/or databases may be stored by and/or maintained in different memory units of access management platform 102 and/or by different computing devices that may form and/or otherwise make up access management platform 102. For example, memory 112 may have, host, store, and/or include access management module 112a, access management database 112b, and machine learning engine 112c. Access management module 112a may have instructions that direct and/or cause access management platform 102 to execute advanced access management techniques. Access management database 112b may store information used by access management module 112a, providing and applying access management techniques, and/or in performing other functions. Machine learning engine 112c may be used to train, deploy, and/or otherwise refine models used to support functionality of the access management module 112a through both initial training and one or more dynamic feedback loops, which may, e.g., enable continuous improvement of the access management platform 102 and further optimize the access management and prevent unauthorized information access.

Figure 2A:
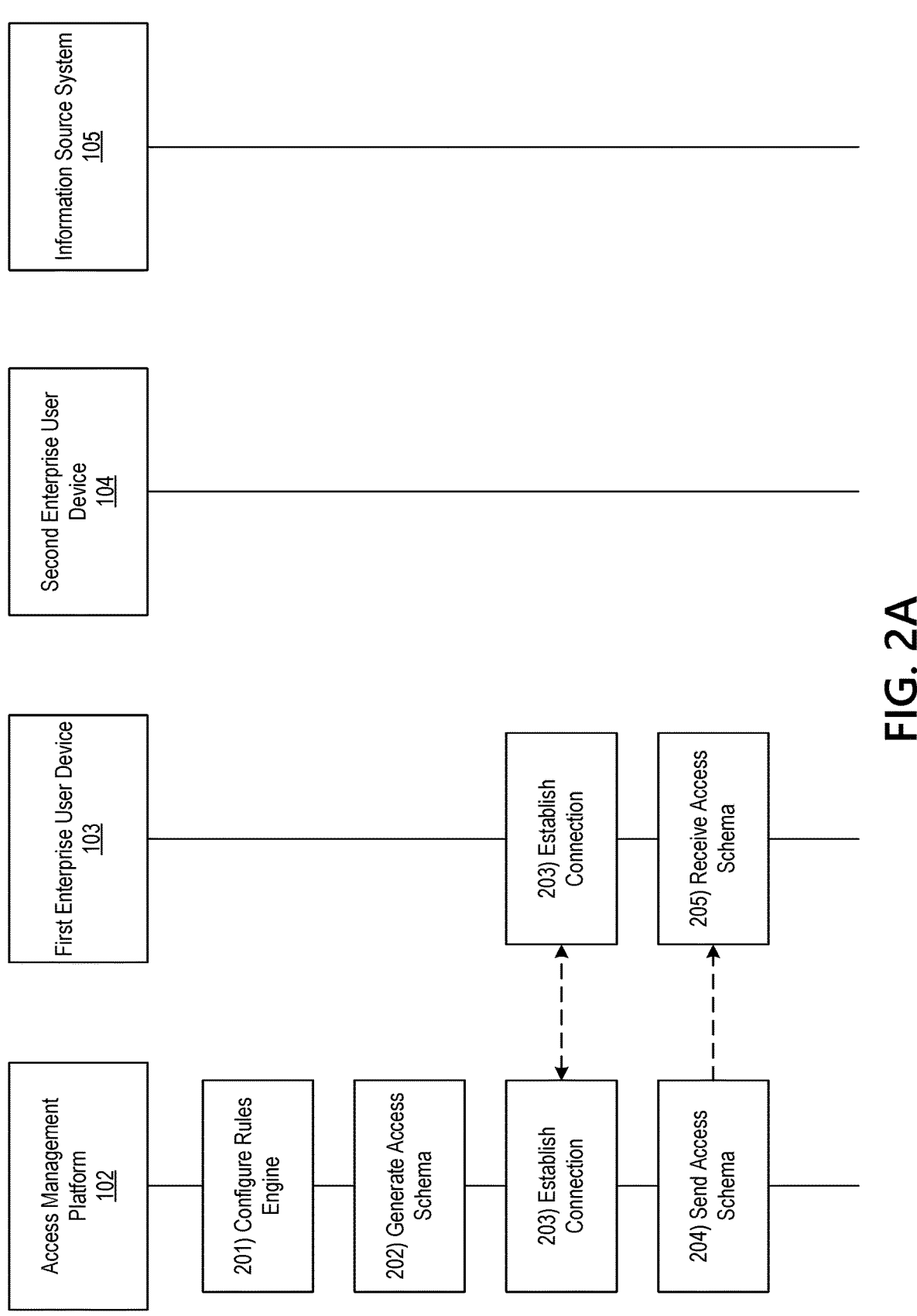
FIGS. 2A-2D depict an illustrative event sequence for preventing unauthorized information access in accordance with one or more example embodiments.

FIGS. 2A-2D depict an illustrative event sequence preventing unauthorized information access in accordance with one or more example embodiments. Referring to FIG. 2A, at step 201, the access management platform 102 may configure a rules engine for use in validating authorization information. For example, the access management platform 102 may configure the rules engine to perform periodic checks on authorization permissions (which may, e.g., have been set by individuals such as a user of the first enterprise user device 103). In some instances, the access management platform 102 may configure the rules engine based on historical access information, which may, e.g., indicate various access patterns. For example, the access management platform 102 may identify that all individuals with access to a particular set of information have a common department, title, level of seniority, or the like. In this example, the access management platform 102 may configure authorization validation policies based on these patterns, against which various authorization permissions may be compared (i.e., was an individual granted access, but such access violates one or more authorization validation policies). In doing so, the access management platform 102 may configure the rules engine to distinguish between valid and invalid user access information. In some instances, the access management platform 102 may continually update and/or otherwise refine the rules engine as additional authorization permissions are allocated.

At step 202, the access management platform 102 may generate an access schema. For example, the access management platform 102 may generate an interface that may prompt for authorization information (e.g., who should have access to what information sources, and to what portion of the sources should they have access). In some instances, the access management platform 102 may generate different access schemas for different individuals (e.g., based on job title, role, level of seniority, department, or the like), which may allow them to specify authorization information for other individuals (e.g., individuals on their team, under their management, or the like).

At step 203, the access management platform 102 may establish a connection with the first enterprise user device 103. For example, the access management platform 102 may establish a first wireless data connection with the first enterprise user device 103 to link the access management platform 102 to the first enterprise user device 103 (e.g., in preparation for sending the access schema). In some instances, the access management platform 102 may identify whether or not a connection is already established with the first enterprise user device 103. If a connection is already established with the first enterprise user device 103. If a connection is not yet established with the first enterprise user device 103, the access management platform 102 may establish the first wireless data connection as described herein.

At step 204, the access management platform 102 may send the access schema to the first enterprise user device 103. For example, the access management platform 102 may send the access schema to the first enterprise user device 103 via the communication interface 113 and while the first wireless data connection is established. In some instances, the access management platform 102 may also send one or more commands directing the first enterprise user device 103 to display the access schema.

At step 205, the first enterprise user device 103 may receive the access schema sent at step 204. For example, the first enterprise user device 103 may receive the access schema while the first wireless data connection is established. In some instances, the first enterprise user device 103 may also receive the one or more commands directing the first enterprise user device 103 to display the access schema.

Figure 2B:
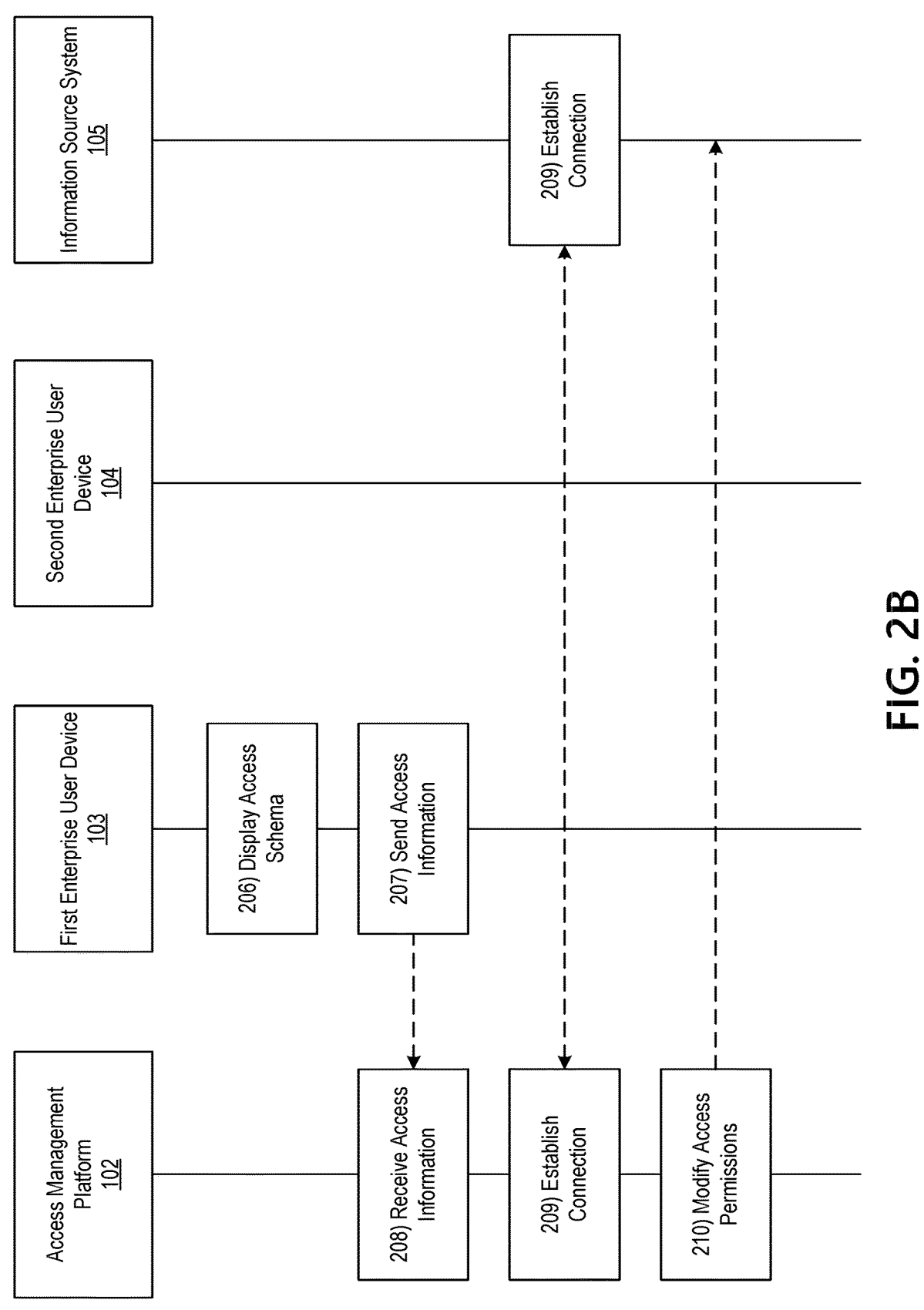

Referring to FIG. 2B, at step 206, based on or in response to the one or more commands directing the first enterprise user device 103 to display the access schema, the first enterprise user device 103 may display the access schema. For example, the first enterprise user device 103 may display a graphical user interface similar to graphical user interface 400, which is shown in FIG. 4. For example, the interface may prompt a user of the first enterprise user device 103 to input individuals who should be granted access to some database, information source, or the like, and what such access entails (e.g., what portions of the corresponding information should be accessible). In some instances, the first enterprise user device 103 may receive, e.g., via the access schema, access information corresponding to the information that was prompted for by the access schema.

At step 207, the first enterprise user device 103 may send the access information to the access management platform 102. For example, the first enterprise user device 103 may send the access information to the access management platform 102 while the first wireless data connection is established.

At step 208, the access management platform 102 may receive the access information. For example, the access management platform 102 may receive the access information via the communication interface 113 and while the first wireless data connection is established.

At step 209, the access management platform 102 may establish a connection with the information source system 105. For example, the access management platform 102 may establish a second wireless data connection with the information source system 105 to link the access management platform 102 to the information source system 105 (e.g., in preparation for modifying access permissions). In some instances, the access management platform 102 may identify whether or not a connection is already established with the information source system 105. If a connection is already established with the information source system 105, the access management platform 102 might not re-establish the connection. If a connection is not yet established with the information source system 105, the access management platform 102 may establish the second wireless data connection as described herein.

At step 210, the access management platform 102 may modify access permissions of the information source system 105 based on the access information received at step 208. In some instances, prior to modifying the access permissions, the access management platform 102 may apply another layer of access validation using the rules engine (e.g., configured at step 201). For example, the access management platform 102 may identify whether or not the access information, received at step 208, is compliant with the authorization permissions defined in the rules engine. If the access management platform 102 identifies that that the access information is compliant, the access management platform 102 may modify the permissions of the information source system 105 (and/or other information source systems) based on the access information. For example, the access management platform 102 may cause access permissions of the information source system 105 to grant access to the individuals specified in the access information (and in doing so to grant such individuals access to portions of the information source system 105 specified in the access information). If instead the access management platform 102 identifies that the access information is not compliant with the authorization permissions, the method may end without granting the requested access.

Figure 2C:
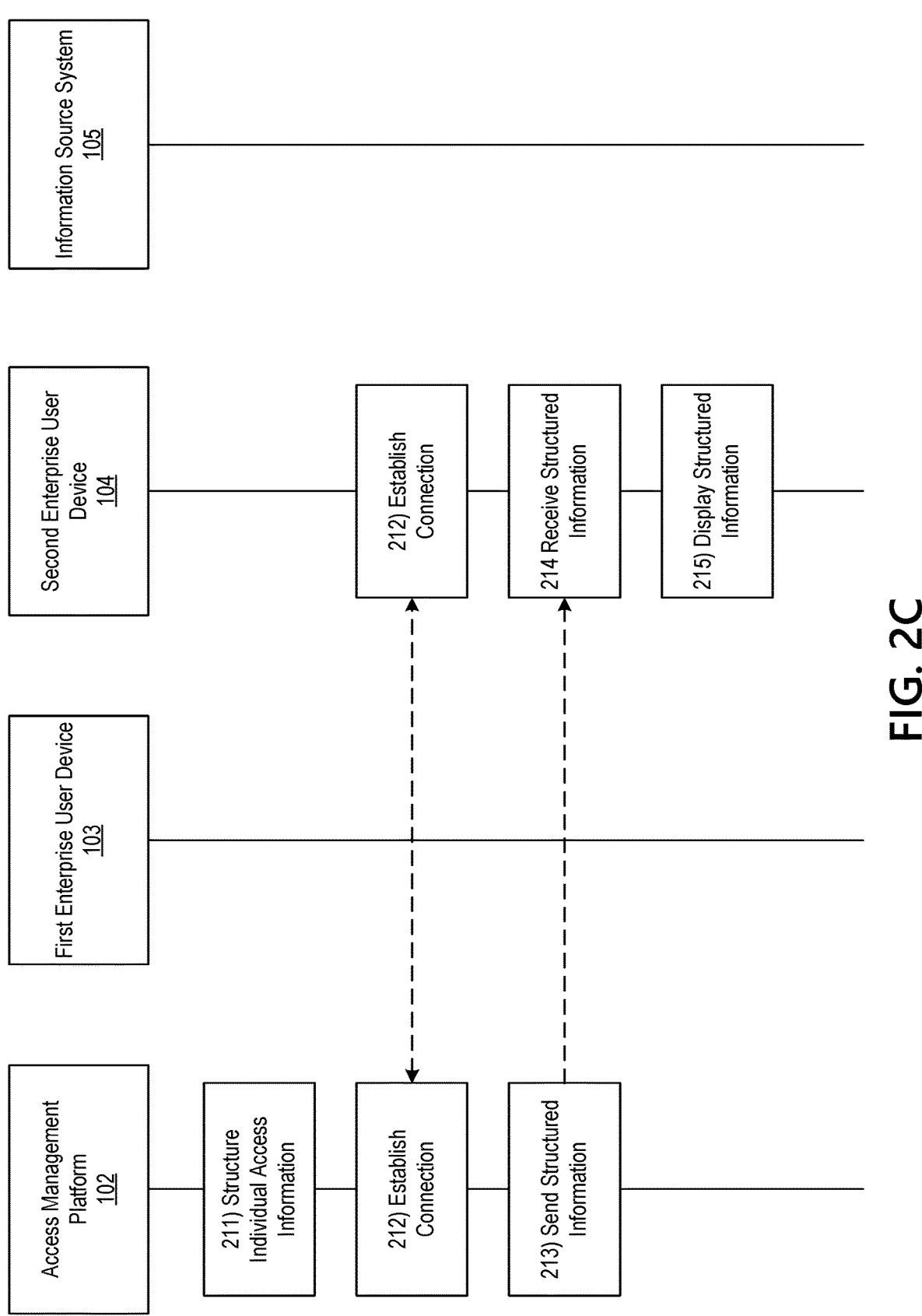

Referring to FIG. 2C, at step 211, the access management platform 102 may structure the individual access information for presentation to the corresponding individuals (e.g., individuals granted authorization/access by the access information). In some instances, this may involve normalizing the access information across all corresponding individuals. In some instances, the access management platform 102 may convert the individual access information to a natural language response (e.g., in contrast to machine readable flags, language, or the like), which may, for example, indicate the portions of the information source system 105 (and/or other information source systems) to which the individuals may have access. For example, the access management platform 102 may translate the individual access information from a first format (e.g., in which the user access information was input at the first user device) into a second format (e.g., configured for display to each of a set of authorized individuals), different than the first format. In some instances, the machine readable flags, language, and/or other format that the individual access information corresponds to may reveal one or more patterns to the access management platform 102, which the access management platform 102 may, e.g., translate to a natural language response based on correlation of the identified pattern with a given natural language response. In some instances, the access management platform 102 may input these natural language responses into a preconfigured natural language response, which may, e.g., include placeholders that may be replaced by the user access information. For example, the access management platform 102 may input the values of "Individual #1," "Portion #1," "Portion #3," and "Portion #4" into a predefined format of "Hello [insert name here]. Please note that you have access to [insert all access permissions until last permission here separated by commas], and [insert last permission here]." In some instances, the access management platform 102 may generate different structured access information for each individual to whom access is granted. In doing so, the access management platform 102 may generate a plain language sentence format for the access information.

In some instances, by receiving a single input of the access information (e.g., at step 206) and translating/formatting that information for display to a plurality of individuals corresponding to the access information, the access management platform 102 may ensure consistency between access permissions granted to the plurality of individuals. In doing so, the access management platform 102 may reduce errors in improperly granting access to unauthorized individuals and/or improperly failing to grant access to authorized individuals, which may, e.g., improve information security.

At step 212, the access management platform 102 may establish a connection with the second enterprise user device 104 (which may, e.g., be controlled or otherwise associated with an individual authorized by the access information). For example, the access management platform 102 may establish a third wireless data connection with the second enterprise user device 104 (e.g., in preparation for sending the structured access information). In some instances, the access management platform 102 may identify whether or not a connection is already established with the second enterprise user device 104. If a connection is already established with the second enterprise user device 104, the access management platform 102 might not re-establish the connection. If a connection is not yet established with the second enterprise user device 104, the access management platform 102 may establish the third wireless data connection as described herein.

At step 213, the access management platform 102 may send the structured access information to the second enterprise user device 104. For example, the access management platform 102 may send the structured access information to the second enterprise user device 104 via the communication interface 113 and while the third wireless data connection is established. In some instances, the access management platform 102 may also send one or more commands directing the second enterprise user device 104 to display the structured access information.

At step 214, the second enterprise user device 104 may receive the structured access information sent at step 213. For example, the second enterprise user device 104 may receive the structured access information while the third wireless data connection is established. In some instances, the second enterprise user device 104 may also receive the one or more commands directing the second enterprise user device 104 to display the structured access information.

At step 215, based on or in response to the one or more commands directing the second enterprise user device 104 to display the structured access information, the second enterprise user device 104 may display the structured access information. For example, the second enterprise user device 104 may display a graphical user interface similar to graphical user interface 500, which is shown in FIG. 5. For example, the second enterprise user device 104 may display a structured natural language output (e.g., as described above with regard to step 211) indicating the authorization granted by the structured access information.

Figure 2D:
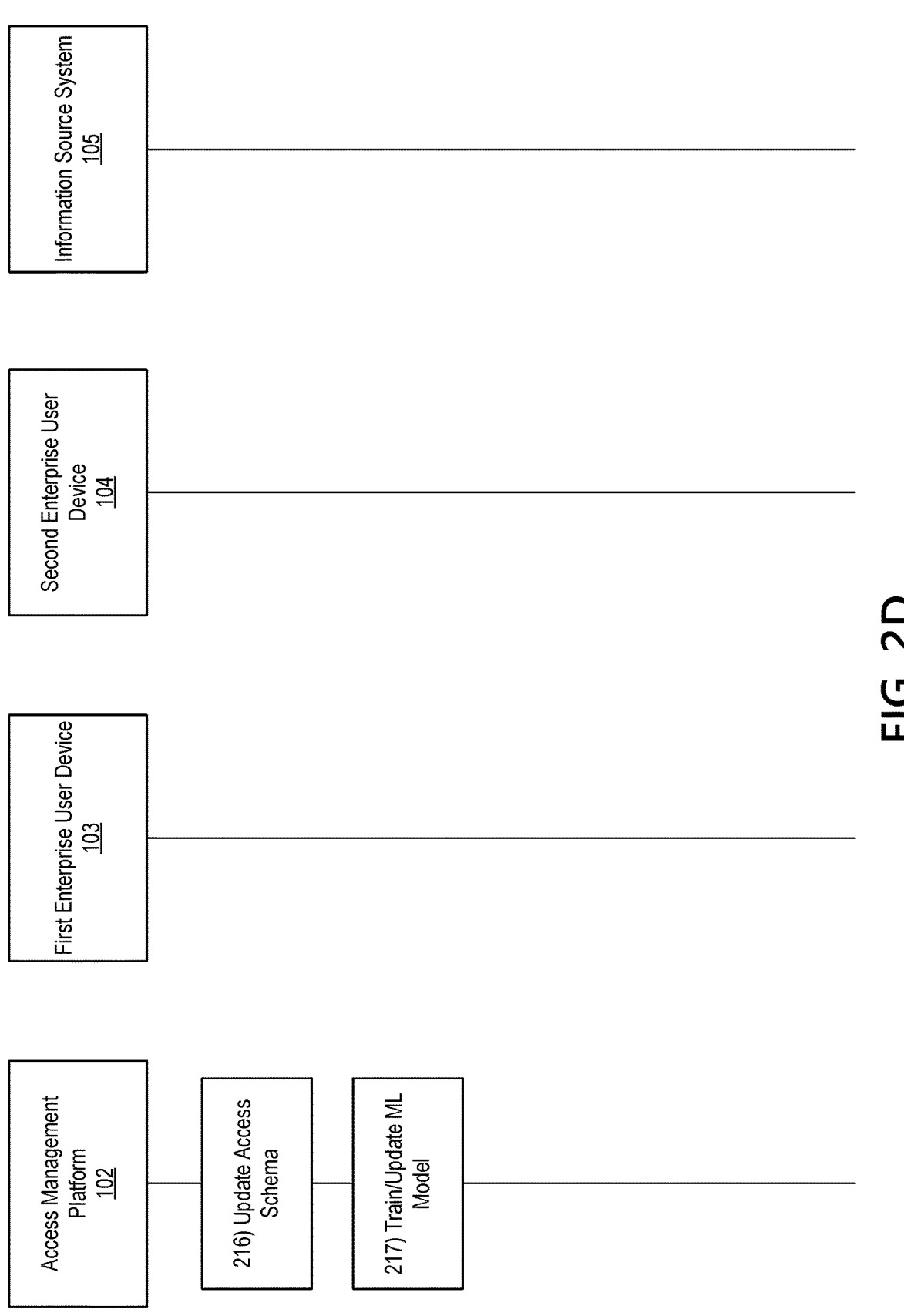

Referring to FIG. 2D, at step 216, the access management platform 102 may update the access schema. For example, in some instances, the first enterprise user device 103 may have received (e.g., at step 206) information corresponding to fields not defined by or presented in the schema. In these instances, the access management platform 102 may update the access schema to prompt for such information going forward. In some instances, the access management platform 102 may make this change after a single instance of receiving such information. In other instances, the access management platform 102 may make this change after such information has been received at least a threshold number of times (where the threshold may, in some instances, be automatically configured, manually set, or the like).

At step 217, the access management platform 102 may train and/or otherwise update a machine learning model to autopopulate the schema (e.g., autopopulate the input fields displayed at step 206). For example, the access management platform 102 may train the machine learning model based on the access information received at step 206 and/or any other received access information and the corresponding input fields on the access schema. Based on this information, the access management platform 102 may train the machine learning model to identify responses to the input fields and to autopopulate the schema accordingly. For example, the access management platform 102 may train the machine learning model to establish stored correlations between such the schema input fields and the access information. Based on these correlations, the machine learning model may be trained to output access information and/or otherwise populate the input fields of the schema.

In some instances, the access management platform 102 may further train the machine learning model to identify anomalies in user access information (such as information input at step 206). For example, the access management platform 102 may train the machine learning model to perform similar actions to those described above with regard to the rules engine, which may, e.g., detect, based on historical information, whether a particular authorization (granted via the user input at step 206) is valid and/or invalid (based on whether or not such authorization deviates from patterns of stored authorized information).

In some instances, in training the machine learning model, the access management platform 102 may use one or more supervised learning techniques (e.g., decision trees, bagging, boosting, random forest, k-NN, linear regression, artificial neural networks, support vector machines, and/or other supervised learning techniques), unsupervised learning techniques (e.g., classification, regression, clustering, anomaly detection, artificial neutral networks, and/or other unsupervised models/techniques), and/or other techniques.

In some instances, once the machine learning model has been trained, it may be applied throughout the above described event sequence to perform autopopulation of fields, validation of access information, and/or otherwise. In some instances, the machine learning model may be continuously refined/further trained through a dynamic feedback loop based on outputs of the model.

Although a single instance of providing access information, modifying access permissions, structuring the access information, and displaying it for a given individual accordingly is described, this is for illustrative purposes only, and these processes may be performed any number of times for any number of individuals without departing from the scope of the disclosure.

Figure 3:
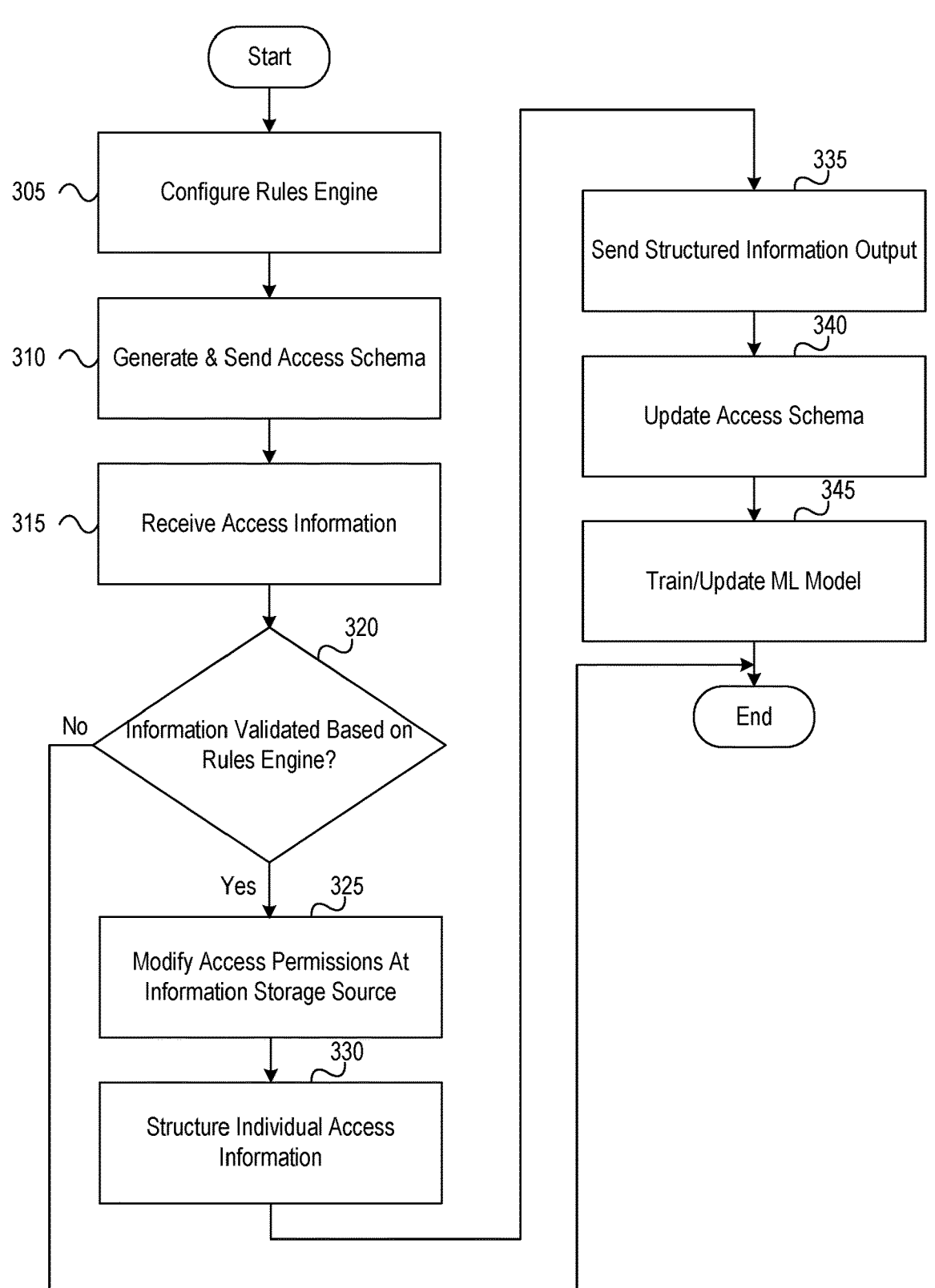
FIG. 3 depicts an illustrative method for preventing unauthorized information access in accordance with one or more example embodiments.

FIG. 3 depicts an illustrative method for preventing unauthorized information access in accordance with one or more example embodiments. Referring to FIG. 3, at step 305, a computing platform comprising one or more processors, memory, and a communication interface may configure a rules engine for validation of access information. At step 310, the computing platform may generate and send an access schema to a first user device. At step 315, the computing platform may receive access information from the first user device. At step 320, the computing platform may use the rules engine to validate the access information. If the information is not validated, the method may end. If the information is validated, the computing platform may proceed to step 325.

At step 325, the computing platform may modify access permissions at an information storage source. At step 330, the computing platform may structure the access information for display at a second user device. At step 335, the computing platform may send the structured information output to the second user device. At step 340, the computing platform may update the access schema based on any newly received information types. At step 345, the computing platform may train and/or otherwise update a machine learning model based on the access information.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more nontransitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A computing platform comprising:
at least one processor;
a communication interface communicatively coupled to the at least one processor; and memory storing computer-readable instructions that, when executed by the at least one processor, cause the computing platform to:

generate a schema to prompt for user access information, wherein the user access information includes: 1) a set of authorized users and 2) one or more portions of an information source to which the set of authorized users have access;

send, to a first user device, the schema and one or more commands directing the first user device to display the schema, wherein sending the one or more commands directing the first user device to display the schema causes the first user device to display the schema, and wherein the user access information is received, at the first user device, via a graphical user interface of the first user device;

receive, from the first user device, the user access information, wherein receiving the user access information comprises receiving additional user access information that includes one or more fields different than those corresponding to the user access information;

translate the user access information to structured user information, wherein translating the user access information translates the user access information from a first format, in which the user access information was input at the first user device, into a second format configured for display to each user of the set of authorized users, and wherein the first format is different than the second format; and send, to a second user device corresponding to one user of the set of authorized users, the structured user information and one or more commands directing the second user device to display the structured user information, wherein sending the one or more commands directing the second user device to display the structured user information causes the second user device to display the structured user information.

2. The computing platform of claim 1, wherein the memory stores additional computer readable instructions that, when executed by the at least one processor, cause the computing platform to:

train, using historical user information, a rules engine, wherein training the rules engine configures the rules engine to distinguish between valid and invalid user access information; and identify, using the rules engine, whether or not the user access information is valid, wherein translating the user access information is in response to identifying that the user access information is valid.

3. The computing platform of claim 1, wherein translating the user access information comprises:

normalizing the user access information, wherein normalizing the user access information comprises identifying one or more flags corresponding to the user access information; and identifying a natural language response corresponding to a pattern of the one or more flags, wherein the structured user information comprises the natural language response.

4. The computing platform of claim 1, wherein the structured user information corresponds to a plain language sentence format.

5. The computing platform of claim 4, wherein translating the user access information to structured user information comprises inputting, into a preconfigured sentence structured in the plain language sentence format, the user access information, wherein the preconfigured sentence includes placeholders that may be replaced by the user access information.

6. The computing platform of claim 1, wherein the memory stores additional computer readable instructions that, when executed by the at least one processor, cause the computing platform to:

sending, to additional user devices of the set of authorized users, the structured user information, wherein the structured user information is consistent between: the one of the set of authorized users and the set of the authorized users.

7. The computing platform of claim 1, wherein the memory stores additional computer readable instructions that, when executed by the at least one processor, cause the computing platform to:

update, based on the one or more fields, the schema.

8. The computing platform of claim 1, wherein the memory stores additional computer readable instructions that, when executed by the at least one processor, cause the computing platform to:

train, based on the user access information, a machine learning model, wherein training the machine learning model configures the machine learning model to auto-populate the schema based on the user access information.

9. The computing platform of claim 8, wherein training the machine learning model further configures the machine learning model to identify anomalies in the user access information.

10. A method comprising:

at a computing platform comprising at least one processor, a communication interface, and memory:

generating a schema to prompt for user access information, wherein the user access information includes: 1) a set of authorized users and 2) one or more portions of an information source to which the set of authorized users have access;

sending, to a first user device, the schema and one or more commands directing the first user device to display the schema, wherein sending the one or more commands directing the first user device to display the schema causes the first user device to display the schema, and wherein the user access information is received at the first user device via a graphical user interface of the first user device;

receiving, from the first user device, the user access information, wherein receiving the user access information comprises receiving additional user access information that includes one or more fields different than those corresponding to the user access information;

translating the user access information to structured user information, wherein translating the user access information translates the user access information from a first format, in which the user access information was input at the first user device, into a second format configured for display to each user of the set of authorized users, and wherein the first format is different than the second format; and sending, to a second user device corresponding to one user of the set of authorized users, the structured user information and one or more commands directing the second user device to display the structured user information, wherein sending the one or more commands directing the second user device to display the structured user information causes the second user device to display the structured user information.

11. The method of claim 10, further comprising:

training, using historical user information, a rules engine, wherein training the rules engine configures the rules engine to distinguish between valid and invalid user access information; and identifying, using the rules engine, whether or not the user access information is valid, wherein translating the user access information is in response to identifying that the user access information is valid.

12. The method of claim 10, wherein translating the user access information comprises:

normalizing the user access information, wherein normalizing the user access information comprises identifying one or more flags corresponding to the user access information; and identifying a natural language response corresponding to a pattern of the one or more flags, wherein the structured user information comprises the natural language response.

13. The method of claim 10, wherein the structured user information corresponds to a plain language sentence format.

14. The method of claim 13, wherein translating the user access information to structured user information comprises inputting, into a preconfigured sentence structured in the plain language sentence format, the user access information, wherein the preconfigured sentence includes placeholders that may be replaced by the user access information.

15. The method of claim 10, further comprising:

sending, to additional user devices of the set of authorized users, the structured user information, wherein the structured user information is consistent between: the one of the set of authorized users and the set of the authorized users.

16. The method of claim 10, further comprising: updating, based on the one or more fields, the schema.

17. The method of claim 10, further comprising:

training, based on the user access information, a machine learning model, wherein training the machine learning model configures the machine learning model to auto-populate the schema based on the user access information.

18. One or more non-transitory computer-readable media storing instructions that, when executed by a computing platform comprising at least one processor, a communication interface, and memory, cause the computing platform to:

generate a schema to prompt for user access information, wherein the user access information includes: 1) a set of authorized users and 2) one or more portions of an information source to which the set of authorized users have access;

send, to a first user device, the schema and one or more commands directing the first user device to display the schema, wherein sending the one or more commands directing the first user device to display the schema causes the first user device to display the schema, and wherein the user access information is received, at the first user device, via a graphical user interface of the first user device;

receive, from the first user device, the user access information, wherein receiving the user access information comprises receiving additional user access information that includes one or more fields different than those corresponding to the user access information;

translate the user access information to structured user information, wherein translating the user access information translates the user access information from a first format, in which the user access information was input at the first user device, into a second format configured for display to each user of the set of authorized users, and wherein the first format is different than the second format; and send, to a second user device corresponding to one user of the set of authorized users, the structured user information and one or more commands directing the second user device to display the structured user information, wherein sending the one or more commands directing the second user device to display the structured user information causes the second user device to display the structured user information.

\* \* \* \* \*